(12) United States Patent
Candelore

(10) Patent No.: US 7,010,685 B1
(45) Date of Patent: Mar. 7, 2006

(54) METHOD AND APPARATUS FOR STORING SCRAMBLED DIGITAL PROGRAMS BY FILTERING PRODUCT IDENTIFIER

(75) Inventor: Brant L. Candelore, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/437,345

(22) Filed: Nov. 9, 1999

(51) Int. Cl.
H04L 9/00 (2006.01)
H04L 9/32 (2006.01)
H04N 7/167 (2006.01)

(52) U.S. Cl. .................... 713/164; 713/154; 713/200; 713/201; 380/200; 380/201; 380/210; 380/239; 380/242; 380/277; 380/280; 380/281

(58) Field of Classification Search ............... 713/154, 713/201, 164, 200; 380/200, 201, 210, 239, 380/277, 242, 280, 281
See application file for complete search history.

(56) References Cited

U.S. PATENT DOCUMENTS

| | | | |
|---|---|---|---|
| 4,700,387 A * | 10/1987 | Hirata | 380/239 |
| 4,802,215 A | 1/1989 | Mason | |
| 4,803,725 A | 2/1989 | Horne et al. | |
| 5,124,117 A * | 6/1992 | Tatebayashi et al. | 380/281 |
| 5,381,481 A * | 1/1995 | Gammie et al. | 380/239 |
| 5,574,787 A * | 11/1996 | Ryan | 380/201 |
| 5,787,171 A * | 7/1998 | Kubota et al. | 380/239 |
| 5,787,179 A * | 7/1998 | Ogawa et al. | 380/46 |
| 5,897,218 A | 4/1999 | Nishimura et al. | |
| 5,917,915 A | 6/1999 | Hirose | |
| 5,923,486 A * | 7/1999 | Sugiyama et al. | 360/60 |
| 6,028,932 A | 2/2000 | Park | |
| 6,061,451 A * | 5/2000 | Muratani et al. | 380/201 |
| 6,157,719 A * | 12/2000 | Wasilewski et al. | 380/210 |
| 2002/0188567 A1 | 12/2002 | Candelore | |
| 2004/0205812 A1 | 10/2004 | Candelore | |

FOREIGN PATENT DOCUMENTS

JP 2003330897 A 11/2003

OTHER PUBLICATIONS

Pazarci, M and Dipcin, V, "Data Embedding in Scrambled Digital Video", Computers and Communication, 2003. (ISCC 2003). Proceedings. Eighth IEEE International Symposium on 2003, vol. 1 Page(s):498-503.*
U.S. Appl. No. 09/437,590, filed Nov. 9, 1999, Candelore.
Benini, et al., Energy-Efficient Data Scrambling on Memory-Processor Interfaces, ISLPED '03, Aug. 25-27, 2003, Seoul Korea.

* cited by examiner

Primary Examiner—Emmanuel L. Moise
Assistant Examiner—Courtney D. Fields
(74) Attorney, Agent, or Firm—Blakely Sokoloff Taylor & Zafman, LLP

(57) ABSTRACT

In accordance with one embodiment, a method for storing a normal scrambled digital program is provided. The method includes receiving a scrambled program, and receiving a plurality of access requirements. Each access requirement can descramble the scrambled program. The method also includes selecting at least one of the access requirements, and storing the scrambled program and the selected requirement.

18 Claims, 9 Drawing Sheets

METHOD AND APPARATUS FOR STORING SCRAMBLED DIGITAL PROGRAMS BY FILTERING PRODUCT IDENTIFIER

BACKGROUND OF THE INVENTION

1. Field of the Invention

The present invention relates to digital devices. More specifically, the present invention relates to a copy management system and method for controlling the reproduction and recording of digital content on and from at least one digital device.

2. General Background

Analog communication systems are rapidly giving way to their digital counterparts. Digital television is currently scheduled to be available nationally to all consumers by the year 2002 and completely in place by the year 2006. High-definition television (HDTV) broadcasts have already begun in most major cities on a limited basis. Similarly, the explosive growth of the Internet and the World Wide Web have resulted in a correlative growth in the increase of downloadable audio-visual files, such as MP3-formatted audio files, as well as other content.

Simultaneously with, and in part due to, this rapid move to digital communications system, there have been significant advances in digital recording devices. Digital versatile disk (DVD) recorders, digital VHS video cassette recorders (D-VHS VCR), CD-ROM recorders (e.g., CD-R and CD-RW), MP3 recording devices, and hard disk-based recording units are but merely representative of the digital recording devices that are capable of producing high quality recordings and copies thereof, without the generational degradation (i.e., increased degradation between successive copies) known in the analog counterparts. The combination of movement towards digital communication systems and digital recording devices poses a concern to content providers such as the motion picture and music industries, who desire to prevent the unauthorized and uncontrolled copying of copyrighted, or otherwise protected, material.

In response, there is a movement to require service providers, such as terrestrial broadcast, cable and direct broadcast satellite (DBS) companies, and companies having Internet sites which provide downloadable content, to introduce protection schemes. Two such copy protection systems have been proposed by the 5C group of the Data Hiding Sub Group (DHSG) (5C comprising representatives of Sony, Hitachi, Toshiba, Matsushita, and Intel) and the Data Transmission Discussion Group (DTDG), which are industry committee sub-groups of the Copy Protection Technical Working Group (CPTWG). The CPTWG represents the content providers, computer and consumer electronic product manufacturers.

The DTDG Digital Transmission Copy Protection (DTCP) proposal is targeted for protecting copy-protected digital content, which is transferred between digital devices connected via a digital transmission medium such as an IEEE 1394 serial bus. Device-based, the proposal uses symmetric key cryptographic techniques to encode components of a compliant device. This allows for the authentication of any digital device prior to the transmission of the digital content in order to determine whether the device is compliant. The digital content is itself encoded prior to transmission so that unauthorized copying of the content will result in copy having an unintelligible format.

One method of encoding the content has been proposed by the DHSG, and is based on watermarking techniques. Although the main focus of the DHSG proposal has been for copy protection of digital movie and video content, particularly as applied to DVD systems, it is expected to be applicable to the copy protection of any digital content distributed electronically via digital broadcasts and networks. The watermarking techniques, which are invisible to the user, allow the incoming content to be marked in a manner that makes it extremely difficult to discern precisely how the content was encoded, and thus extremely difficult to remove or alter the watermark without damaging the content. The DHSG has determined three primary cases of detection and control that such a technology should accomplish: playback, record and generational copy control. It is anticipated that the watermarking technology will allow the content provider to specify at least whether the content is "copy never," "copy once," and "copy free" content. "Copy never" is used to mark digital content to indicate that the content is not allowed to be copied, while "copy free" indicates that the content may be copied freely and which can be marked with additional information. This is different than material that is never marked. Finally, "copy once" is used to indicate that the digital content is allowed to be copied only once. As a copy is being made, the original "copy once" content and the newly copied content are re-marked with "no more copy." Of course, other types of copy management commands may limit the playing or reproduction of such digital content; for example, to a specific period of time, duration, or number of plays or viewings.

Thus, even today, the functionality of digital devices such as set-top boxes, digital televisions, digital audio players, and similar such digital devices extends beyond their historical role of conditional access (CA), i.e., merely descrambling content to a CA-clear format for real-time viewing and/or listening, and now include constraints and conditions on the recording and playback of such digital content. For example, currently, copying of scrambled content for subsequent descrambling and viewing or listening may be permitted with the appropriate service/content provider authorization or key provided to the digital device.

A disadvantage of such digital devices is that do not allow the simultaneous viewing of content in a CA descrambled format (hereinafter referred to as "descrambled content") and the recording of content in a CA-scrambled content (hereinafter referred to as "scrambled content"), both of which are typically copy-protected, using, for example, using some sort of watermarking process, as proposed by the DHSG. Thus, the digital devices support either the viewing of descrambled content or the recording of such scrambled content, but not both. Additionally, in those instances where the digital device is connected to other digital devices over a transmission medium via a digital interface, there may also be additional encoding at the digital interface prior to input into the transmission medium; e.g., using the 5C-proposed copy-protection scheme. In such cases, the viewable form, e.g., descrambled content, with "copy never" attributes would not be recordable by downstream devices. However, the non-viewable, or scrambled, content would typically have "copy free" attributes. As the simultaneous viewing of descrambled content and the recording of scrambled content is not possible under these scenarios, it is difficult to "time shift" copy-protected content and impossible to record a scrambled program while it is being viewed, even though such recording is for the viewer's/listener's sole entertainment at a later point in time. Both are considered desirable by viewers, listeners and other consumers.

Therefore, in view of the interests of the aforementioned viewers, listeners and other consumers, it would be desirable to provide a system that allows for the simultaneous viewing, listening or playing of descrambled content and recording of the scrambled content which also addressed the concerns of the various content providers.

SUMMARY

In accordance with an embodiment of the present invention, a method for storing a normal scrambled digital program is provided. The method includes receiving a scrambled program, and receiving a plurality of access requirements. Each access requirement can descramble the scrambled program. The method also includes selecting at least one of the access requirements, and storing the scrambled program and the selected requirement.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
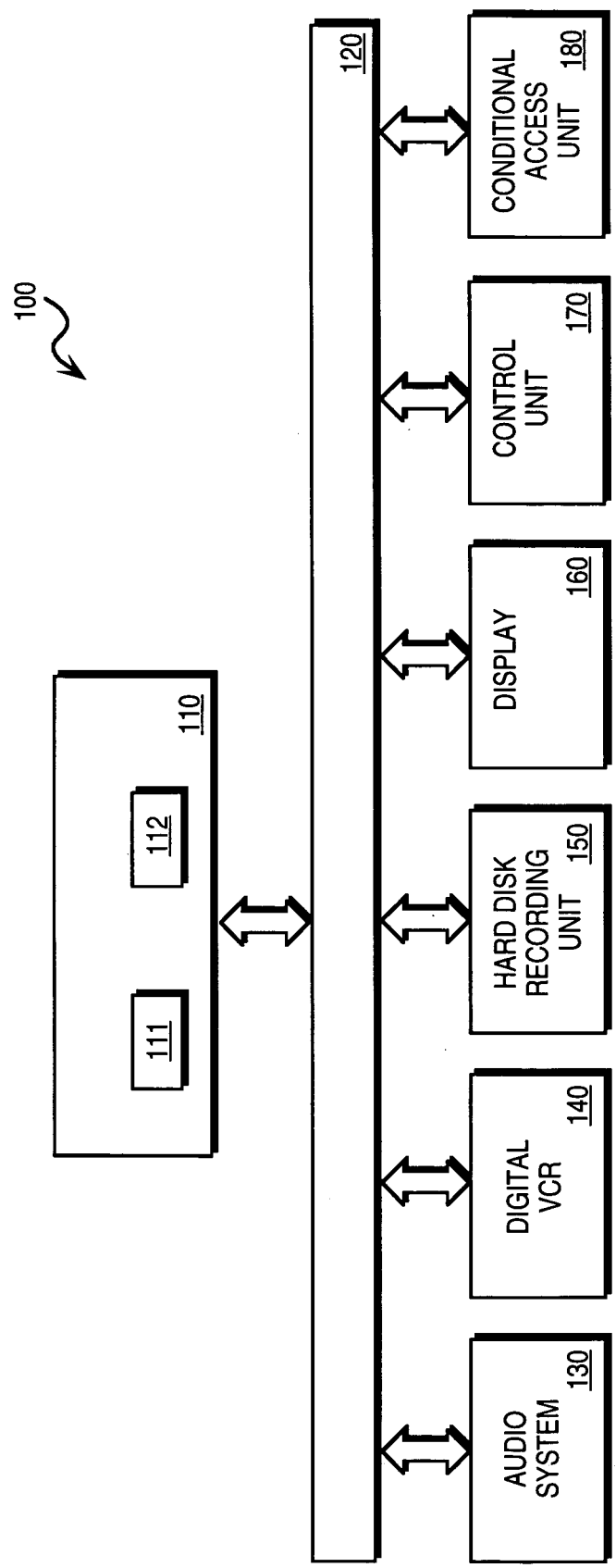
FIG. 1 is a block diagram of an exemplary entertainment system including one embodiment of a digital device.

FIG. 1 is a block diagram of an entertainment system 100 including one embodiment of the copy management system of the present invention. The entertainment system 100 includes a digital device 110 for receiving a digital bitstream including program data from one or more service providers. Such service or content providers can include terrestrial broadcasters, cable operators, direct broadcast satellite (DBS) companies, companies providing content for download via the Internet, or any similar such content and/or service provider. The program data may include system information, entitlement control messages, entitlement management messages, content, and other data, each of which will be described briefly. System information may include information on program names, time of broadcast, source, and a method of retrieval and decoding, and well as copy management commands that provide digital receivers and other devices with information that will control how and when program data may be replayed, retransmitted and/or recorded. These copy management commands may also be transmitted along with entitlement control messages (ECM), which are generally used by the conditional access unit to regulate access to a particular channel or service. Entitlement management messages (EMM) may be used to deliver privileges to the digital receiver 111 such as rights and descrambling keys. As known, a decryption key is generally a code that is required to restore scrambled data, and may be a function of the rights granted. Finally, content in the program data stream may include audio and video data, which may be in a scrambled or clear format.

The digital device 110 includes a digital receiver 111, which processes the incoming bitstream, extracts the program data therefrom, and provides the program data in a viewable format. The thus extracted program data is then provided to a decoding unit 112 for further processing, including separation of the system information from the content, as well as decoding, or decompressing, of the content to its original form. The digital receiver 111 also regulates access to the program data by other components on the entertainment system 100, and according to one embodiment of the present invention, supports the simultaneous transmission of program data having content in a descrambled format (hereinafter referred to as "descrambled content") and program data having content in a scrambled format (hereinafter referred to as "scrambled content").

According to one embodiment of the present invention, the digital device 110 is a digital television set where the digital receiver 111 is a set-top box integrated therein, and the decoding unit 112 is an MPEG (Motion Picture Experts Group) decoder. The digital television set's display (not shown) is, according to this embodiment, integrated within the digital device 110. Alternatively, it will be appreciated that the digital device 110 may include only the digital receiver 111 and/or the decoder unit 112, with a display being external to the decoding device 110. An example of this embodiment would be an integrated receiver/decoder (IRD) such as a stand-alone set-top box which outputs NTSC, PAL or $Y_pB_pR$ signals. All such embodiments are included within the scope of the present invention.

Digital device 110 may be coupled to other components in the entertainment system 100 via a transmission medium 120. The transmission medium 120 operates to transmit control information and data including program data between the digital device 110 and other components in the entertainment system 100. It will be appreciated that the entertainment system 100 of FIG. 1 is merely an exemplary embodiment, and that other analog and/or digital components may be added or substituted for the components briefly described hereinafter.

Referring to FIG. 1, the entertainment system 100 may include an audio system 130 coupled to the transmission medium 120. The audio system 130 may include speakers and an audio player/recorder such as a compact disc player, a Sony MiniDisc™ player, or other magneto-optical disc that may be used to play and/or record audio data. A digital VCR 140, such as a D-VHS VCR, may also be coupled to the digital device 110 and other components of the entertainment system 100 through the transmission medium 120. As known, the digital VCR 140 may be used to record analog or digital audio, video, and other data transmissions, and according to an embodiment of the present invention, may be used to record program data received by the digital device 110 and transmitted to the digital VCR over transmission medium 120.

A hard disk recording unit 150 may also be coupled to digital device 110 and other components via transmission medium 120. The hard disk recording unit 150 may be a personal computer system, a stand-alone hard disk recording unit, or other hard disk recording device capable of recording analog or digital audio, video and data transmissions. As with digital VCR 140, according to one embodiment of the present invention, the hard disk recording unit 150, may be used to record program data received by the digital device 110 and transmitted to the hard disk recording unit 150 over transmission medium 120.

Display 160 may include a high definition television display, a monitor or other device capable of processing digital video signals. In an embodiment where the digital device 110 is a stand-alone set-top box, display 160 may be a digital television set.

Finally, a control unit 170 may be coupled to the transmission medium 120. The control unit 170 may be used to coordinate and control the operation of some or each of the components on the entertainment system 100, as well and other electronic devices remotely coupled thereto.

Figure 2:
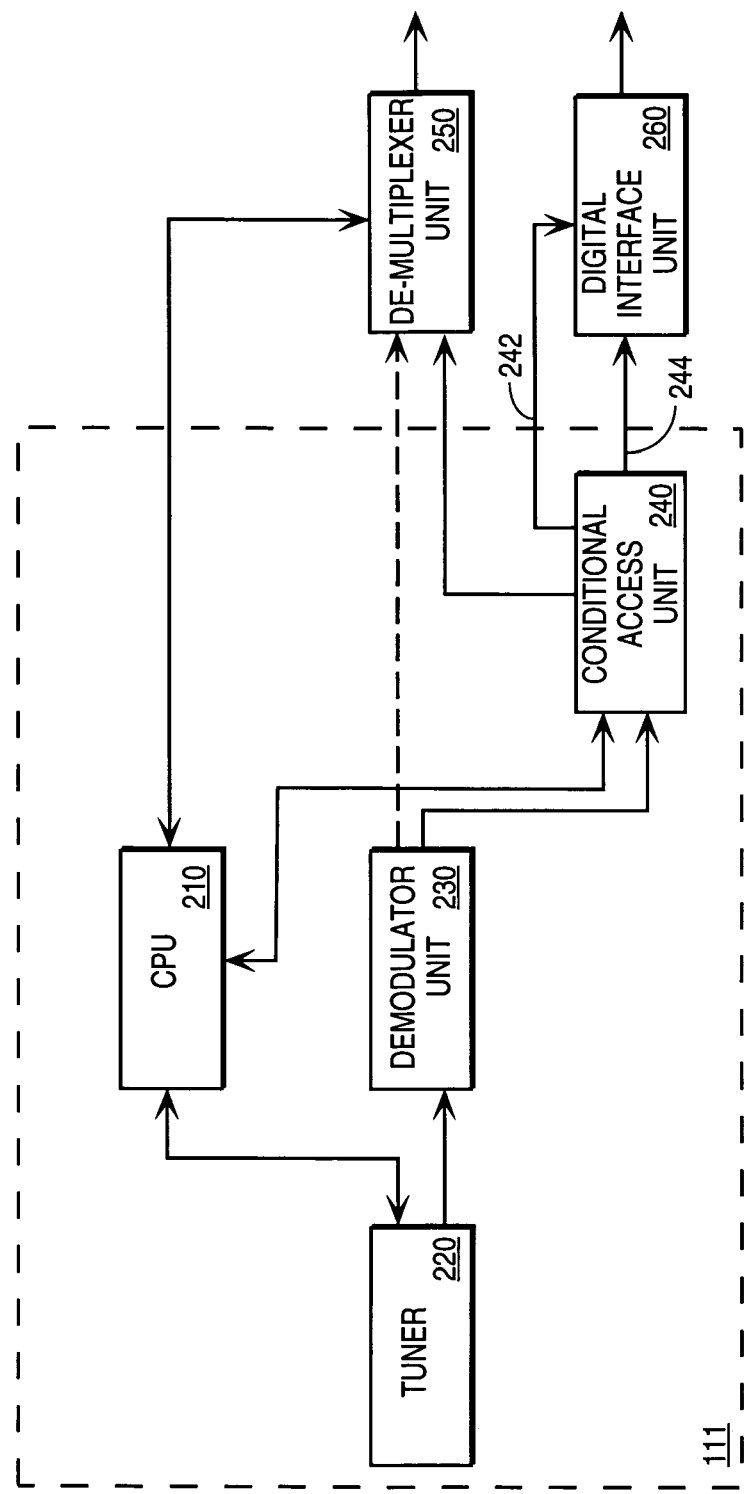
FIG. 2 is a block diagram of one embodiment of a digital receiver of the digital device.

FIG. 2 is a block diagram of one embodiment of the digital receiver 111 including the copy management system according to the present invention. The digital receiver 111 includes a central processing unit (CPU) 210, which controls the overall operation of the digital receiver 111, and determines the frequency in which a selected channel is broadcast or otherwise transmitted. This information is then transmitted to a tuner 220, which then selects the appropriate frequency of the terrestrial, cable, satellite, or Internet transmission in which to receive the incoming digital bitstream, including program data. The CPU 210 may also support a graphical user interface (GUI), such as an electronic programming guide (EPG), the latter allowing a user to navigate through various channels and program options to select a desired channel or program for viewing, listening, recording and the like. The GUI may be displayed on either a display (not shown) of digital device 110 (e.g., where digital device 110 is a digital television set), or on display 160 (e.g., where digital device 110 is a stand-alone set-top box).

Once the tuner 220 has selected the appropriate frequency, it amplifies the incoming digital bitstream, and provides the output bitstream to a demodulator unit 230. The demodulator unit 230 receives the bitstream from the tuner 220 and demodulates the bitstream to provide program data as originally transmitted. The type of demodulation effected by the demodulator unit 230 will of course depend on the type of transmission as well as the modulation process used in the transmission process. For example, in the case of cable transmissions and Internet transmissions received over cable modems, the demodulator unit 230 may perform quadrature amplitude demodulation (QAD), while for satellite broadcasts, quadrature phase shift key (QPSK) demodulation will likely be required. Terrestrial broadcasts, will likely require vestigial side band (VSB) demodulation. The present invention is not limited to any one type of transmission and modulation/demodulation scheme, and other schemes are within the scope and spirit of the present invention. In addition to effecting the demodulation process, demodulator unit 230 may also perform error correction on the received bitstream.

The thus demodulated bitstream is now preferably provided to a conditional access unit 240. (That portion of the demodulated bitstream that is not encrypted may bypass the conditional access unit 240 and be provided directly to the demultiplexer 250 as shown by the dashed lines in FIG. 2. This might also be the case where none of the bitstream needs decrypting, and/or where there is no conditional access module). The conditional access unit 240 generally performs key management and decryption, as well as descrambling functions as follows.

Typically, if the CPU 210 determines that the program data in the digital bitstream includes scrambled content, that program data is provided to a conditional access unit 240. At this point the CPU 210 may transmit packet identifier (PID) information to the conditional access unit 240, such PID information informing the conditional access unit 240 where in the program data the ECM may be found. The CPU 210 may instead receive the ECM and deliver it to the conditional access unit 240. Alternatively, the conditional access unit 240 may have demultiplexing capabilities allowing it to directly obtain the location of the ECM from the bitstream itself. As discussed previously, the ECMs regulate a user's access to a particular channel or service, and determines the access rights that are needed to be held by a receiver 111 in order to grant access. The ECMs may also be used to deliver a decrypting or descrambling key or to deliver information (e.g., an algorithm) as to how to derive a key that may be used to descramble scrambled content. Using such key or information regarding derivation of such key, the conditional access unit 240 may descramble the content contained in the program data. Alternatively, the conditional access unit may provide the key to the demultiplexer 250 which will perform the descrambling.

Importantly, although the conditional access unit 240 is shown as an integral, or embedded, in that both the descrambling and decrypting functions are effected internally in receiver 111, the conditional access unit may also split or external. An external conditional access unit descrambles the program data content and decrypts the keys externally; e.g., as is the case with the National Renewable Security System (NRSS) conditional access modules. In a split conditional access unit, the program data content is descrambled within the digital receiver 111, while the key decryption is completed externally, e.g., via a "smart card." All of these systems are intended to be within the spirit and scope of the present invention.

Once the conditional access unit 240 descrambles the program data content, the program data is input to demultiplexer unit 250, which separates the system information from the content in the program data. According to an embodiment of the demultiplexer unit 250, the demultiplexer unit 250 parses the program data for PIDs that are associated with system information, audio information, and video information, and then transmits the system information to the CPU 210 and the audio and video information to the decoder unit 112. In accordance with one embodiment of the present invention, a digital interface unit 260 is coupled to the conditional access unit 240. Operation of this unit, which allows the receiver 111 to communicate with other digital components in the entertainment system 100, will be discussed at a later point.

The CPU 210, tuner 220, demodulator unit 230, conditional access unit 240, demultiplexer unit 250, and digital interface unit 260 may be implemented using any known technique or circuitry. In one embodiment of the present invention, the CPU 210, tuner 220, demodulator unit 230, demultiplexer unit 250, and digital interface unit 260 all reside in a single housing, while the conditional access unit 240 resides in an external NRSS conditional access module (as discussed above). Alternatively, the conditional access unit can take the form factor of a Personal Computer Memory Card International Association (PCMCIA) Type II card or a smart card.

Figure 3:
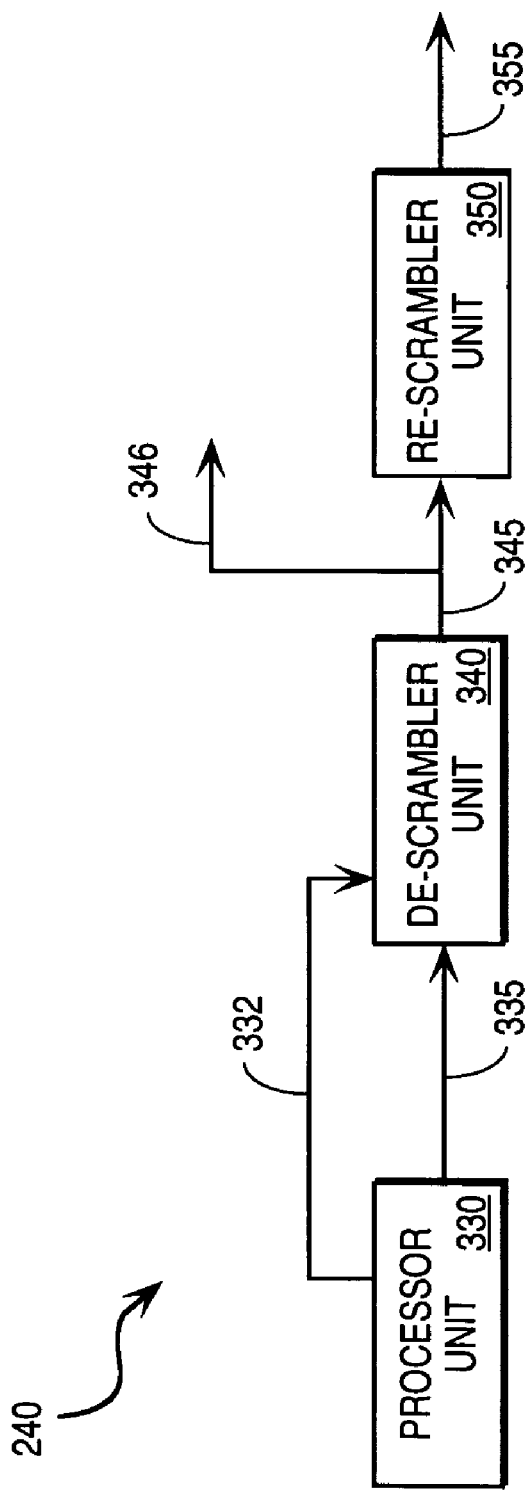
FIG. 3 is a block diagram of one embodiment of the conditional access unit of the copy management system of the present invention.

FIG. 3 shows a block diagram of one embodiment of the conditional access unit 240 of the copy management system of the present invention. The conditional access unit 240 includes a processor unit 330, which receives the demodulated program data from the demodulator unit 230 and obtains PID information identifying where ECMs may be found in the program data. Again, this packet identifier information may be provided by the CPU 210 or obtained directly from the bitstream by the conditional access unit 240 itself. It is also possible for the CPU 210 to deliver ECMs to the conditional access unit 240.

In one embodiment of the present invention, the processor unit 330 processes the ECMs and derives a key for descrambling the content. The processor unit 330 then outputs program data and the key to a descrambler unit 340 over line, pin or set of pins 335 (hereinafter, "line 335"). The descrambler unit 340 receives the key and the program data off line 335 and processes the program data, including descrambling or decrypting the program data content with the key. The descrambler unit 340 then transmits the program data with the now clear content over line, pin or set of pins 346 (hereinafter, "line 346") to the demultiplexer unit 250 (FIG. 2), and then to the decoding unit 112, and finally for display and viewing by a user.

The descrambler unit 340 also transmits the program data with the now clear content over line, pin or set of pins 345 (hereinafter, "line 345") to a re-scrambler unit 350. The re-scrambler unit 350 receives the program data and processes the data, including re-scrambling the clear content. Re-scrambling can use a similar algorithm as used in the descrambling process. For example, if DES could be used for both the descrambling and re-scrambling processes.

(It will be appreciated that although for ease of understanding, the processor unit 330, the descrambler unit 340, and the re-scrambler unit 350 are shown as separate elements in FIG. 3, these elements may be integrated in one device, or may be implemented using any known circuitry or technique).

The re-scrambler unit 350 may re-scramble the content in any one of several ways. For example, in one embodiment of the copy management system of the present invention, it may re-scramble the content using the ECMs originally transmitted in the received bitstream and received in receiver 111. Alternatively, separate re-scrambling keys may be transmitted in the original bitstream in separate ECMs and extracted by the re-scrambler unit 350 from the program data received from the descrambler unit 340. In another embodiment of the copy management system of the present invention, the re-scrambler unit 350 may have encrypting or encoding capabilities, allowing it to re-scramble the content using a local key which may be unique to receiver 111. Such a key would not be delivered using an ECM, but could be delivered to the re-scrambler unit 350 using an EMM. Alternatively, the key could be a non-changeable key which has been created at the time of manufacture of the re-scrambler unit.

In yet another embodiment of the present invention, control words may be used in addition to keys. In such embodiment, the control words are first scrambled using a key, and then are inserted into the bitstream program data prior to transmission. Under this method, in order to descramble the content in the program data, the control access unit 240 must first derive the key (using any of the aforementioned methods) and then use the derived key to descramble the control words. The descrambled control words are then applied to descramble the content. This method gives added flexibility and security in the transmission, particularly in the case where a local key is used (i.e., located in the receiver 111), in that the control words (and thus access rights) may be changed periodically without requiring a change of the local key. Using this method, the re-scrambler unit 350 may scramble the content using one of several methods. The re-scrambler unit 350 may use the originally transmitted control words and key to re-scramble the control words. Alternatively, the re-scrambler unit 350 may use local control words and keys that are unique to the receiver 111. It will be appreciated to those skilled in the art that any one of the aforementioned methods of scrambling and descrambling may be used alone or in combination, and these and other similar methods are intended to be within the scope and spirit of the present invention.

Once the content is re-scrambled, the program data including the re-scrambled content is transmitted over line, pin or set of pins 355 (hereinafter, "line 355"). In one embodiment of the present invention, the re-scrambled program data is output over digital interface unit 260, as shown in FIG. 2. The digital interface unit 260 encodes this program data with copy management commands that indicate that the program data is "copy free." The digital interface unit 260 interfaces with the components on the transmission medium 120 (shown in FIG. 1) to determine which components are authorized to decode the encoded program data, and then transmits a key to the authorized components for decoding the encoded program data. According to one embodiment of the entertainment system 100, the digital interface unit 260 initiates an authentication process that identifies devices that are authorized to decode encoded program data, and then encodes program data transmitted on the IEEE 1394 transmission medium using the DTDG's DTCP encoding scheme. It will be appreciated, however, that other encoding schemes may be implemented without detracting from the spirit and scope of the invention.

Thus, as line 346 transmits the clear content to the demultiplexer unit 250 for display on a display which is either integral with, or directly connected to, digital device 110, and line 345 carries the re-scrambled content over transmission medium 120 for recording on one or more of any of several components connected to the transmission medium 120, the conditional access unit 240 allows the user to simultaneously view a program in the clear while recording the scrambled version. It will be appreciated that, under this embodiment, the content provider can control when and if the user can copy or even view the content again given that the re-scrambled stream which is output over line 345 must be descrambled with the appropriate keys and/or control words before viewing, and thus must be processed by the conditional access unit 240.

An alternate embodiment of the conditional access unit 240 of the copy management system of the present invention is described with reference to FIG. 4. In this embodiment, the conditional access unit 240 includes a processor unit 330 similar to that described in FIG. 3. The processor unit 330 also outputs program data which may include scrambled content over a line, pin, or set of pins 335 (hereinafter, "line 335") to a descrambler unit 340. Descrambler unit 340 is also similar to the descrambler unit 340 of the embodiment of FIG. 3.

At this point, the descrambler unit outputs program data with clear content to either the demultiplexer unit 250 or to the digital interface unit 260 via line 345. The conditional access unit 240 also includes a line, pin, or set of pins 436 (hereinafter, "line 436") coupled to line 335 which bypasses the descrambling unit 340 and which transmitting program data, possibly including scrambled content, to the digital interface unit 260.

Figure 4:
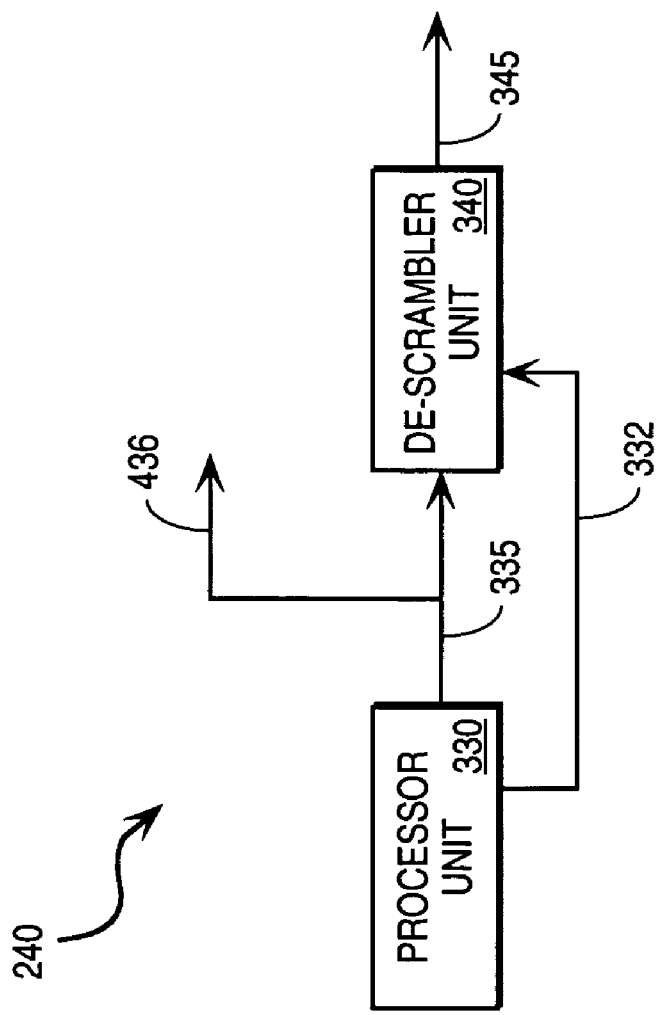
FIG. 4 is a block diagram of an embodiment of the conditional access unit of the system of the present invention; and, FIG. 5 is a block diagram of an embodiment of the digital receiver of the digital device.

As with the embodiment disclosed in FIG. 3, the conditional access unit 240 of FIG. 4 provides two bitstreams of program data; line 345 carries program data including clear content, while line 436 carries program data including scrambled content. Thus, as line 345 transmits the clear content to the demultiplexer unit 250 for display on a display which is either integral with, or directly connected to, digital device 110, and line 436 provides the scrambled content over transmission medium 120 via digital interface unit 260 for recording on one or more of any of several components connected to transmission medium 120, the conditional access unit 240 of the embodiment of FIG. 4 also allows the user to simultaneously view a program in the clear, while recording the scrambled version. As with the embodiment of FIG. 3, a content provider can control when and if a user can copy or view again copy-protected content.

It is expected that there will be multiple content and service providers as well as multiple manufacturers of digital devices such as digital device 110. As a result, it is envisioned that there may be certain instances where the embodiments of conditional access unit 240 as shown in FIGS. 3 and 4 are not available. For example, a content or service provider may desire that the copy management system of the present invention be implemented in any digital device 110 which is authorized to receive such content or service, without regard to the manufacturer or particular design constraints of the digital device 110. Furthermore, in instances where either the content provider or device manufacturer wishes to implement the copy management system of the present invention on devices which may already have a conditional access system implemented, access to the implemented conditional access system to add the copy management system of the present invention is likely to be limited and/or costly. For example, addition of the re-scrambling unit 350 of the embodiment of the conditional access unit of FIG. 3 may not be possible, nor may the availability of an additional line 436 for providing scrambled content (embodiment of the conditional access unit of FIG. 4). It may be desirable and/or necessary in these and other instances to implement a separate conditional access unit.

Figure 5:
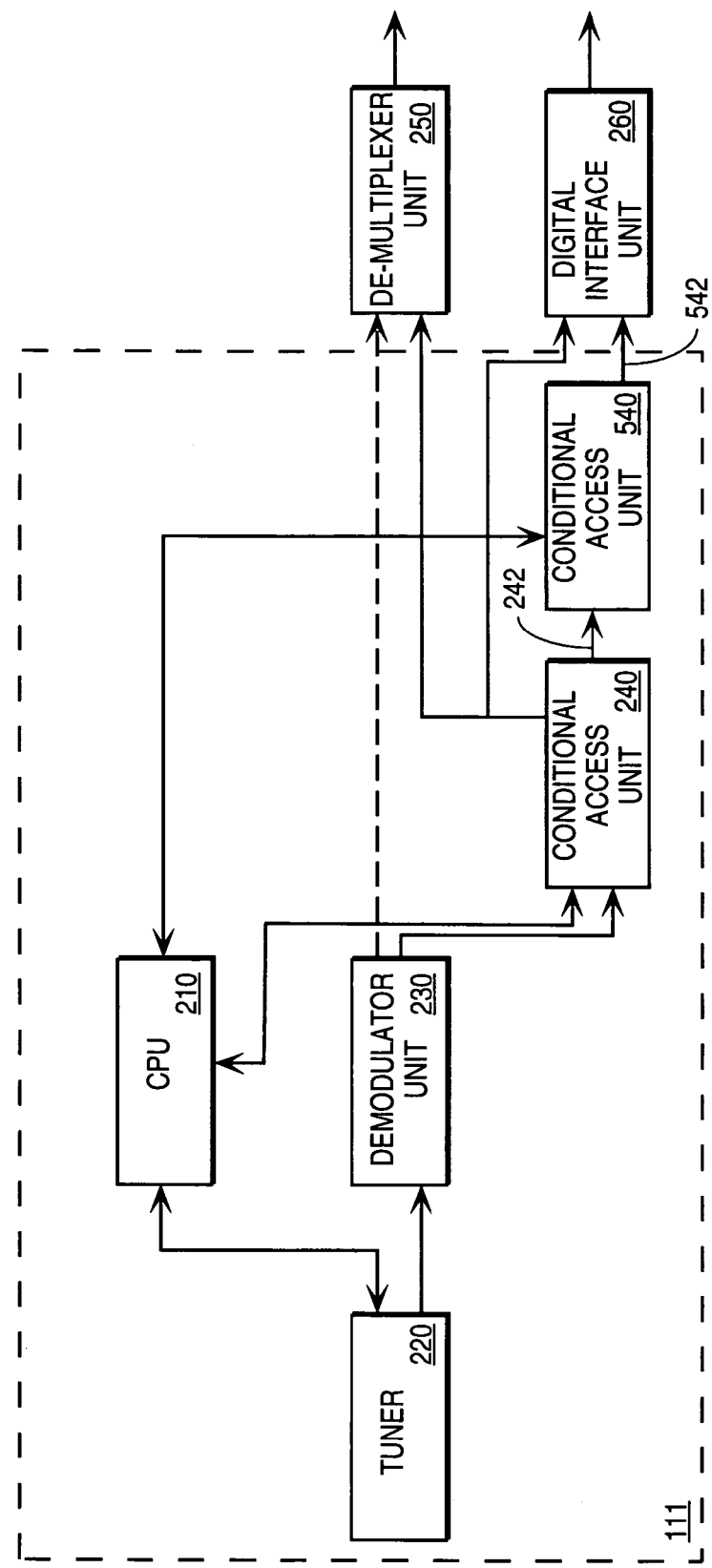

As seen in FIG. 5, an alternate embodiment of the digital receiver 111 having the copy management system of the present invention includes an additional conditional access unit 540. Although the conditional access unit 540 may be built into the digital receiver 111, it is expected that digital receiver will have an expansion slot, such as a PCMCIA slot or Universal Services Bus (USB) slot to receive a card or device which includes the conditional access unit 540. As with the embodiment of FIG. 2, the digital receiver 111 of this embodiment includes a CPU 210, a tuner 220, demodulator unit 230, a conditional access unit 240, a demultiplexing unit 230, and a digital interface unit 260. In addition to these elements, the digital receiver 111 of FIG. 4 includes a second conditional access unit 540, the operation of which will be now described.

Conditional access unit 540 receives an output bitstream including program data having clear content from first conditional access unit 240, and re-scrambles the data in response to control commands received from CPU 210. Conditional access unit 540 may re-scramble the program data content using the ECMs transmitted in the original bitstream received in digital receiver 111 or with a key transmitted by the conditional access unit 240. Alternatively, conditional access unit 540 may use its own unique, local key. If the content was originally scrambled using control words in addition to keys, the conditional access unit 540 may use the originally transmitted control key to scramble the control words and use the originally transmitted control words to scramble the program data content. It may also used its own local control words and key to scramble the key and content, respectively. It will be appreciated to those skilled in the art that any one of the aforementioned methods of scrambling may be used alone or in combination, and these and other similar methods are intended to be within the scope and spirit of the present invention. It will also be appreciated that conditional access unit 540 also operates in a manner similar to that of re-scrambling unit 350 of the conditional access unit 240 of FIG. 3, however, again, access to the original conditional access unit 240 is not required in this embodiment.

Once the program data content is re-scrambled, conditional access unit 540 transmits the program data to digital interface unit 260, where it is encoded with copy management commands. Thereafter, the program data may be provided over transmission medium 120 to any components connected thereto for recording. Thus, according to this embodiment of the digital receiver 111, one bitstream including program data having clear content is provided to demultiplexer unit 250 and then to decoding unit 112 (FIG. 1) for display and viewing by a user, while a second bitstream including program data having scrambled content is available for recording by any component connected to transmission medium 120. As with the previous embodiments, a content or service provider can control when and if a user can copy or view again content which is copy-protected.

Figure 6:
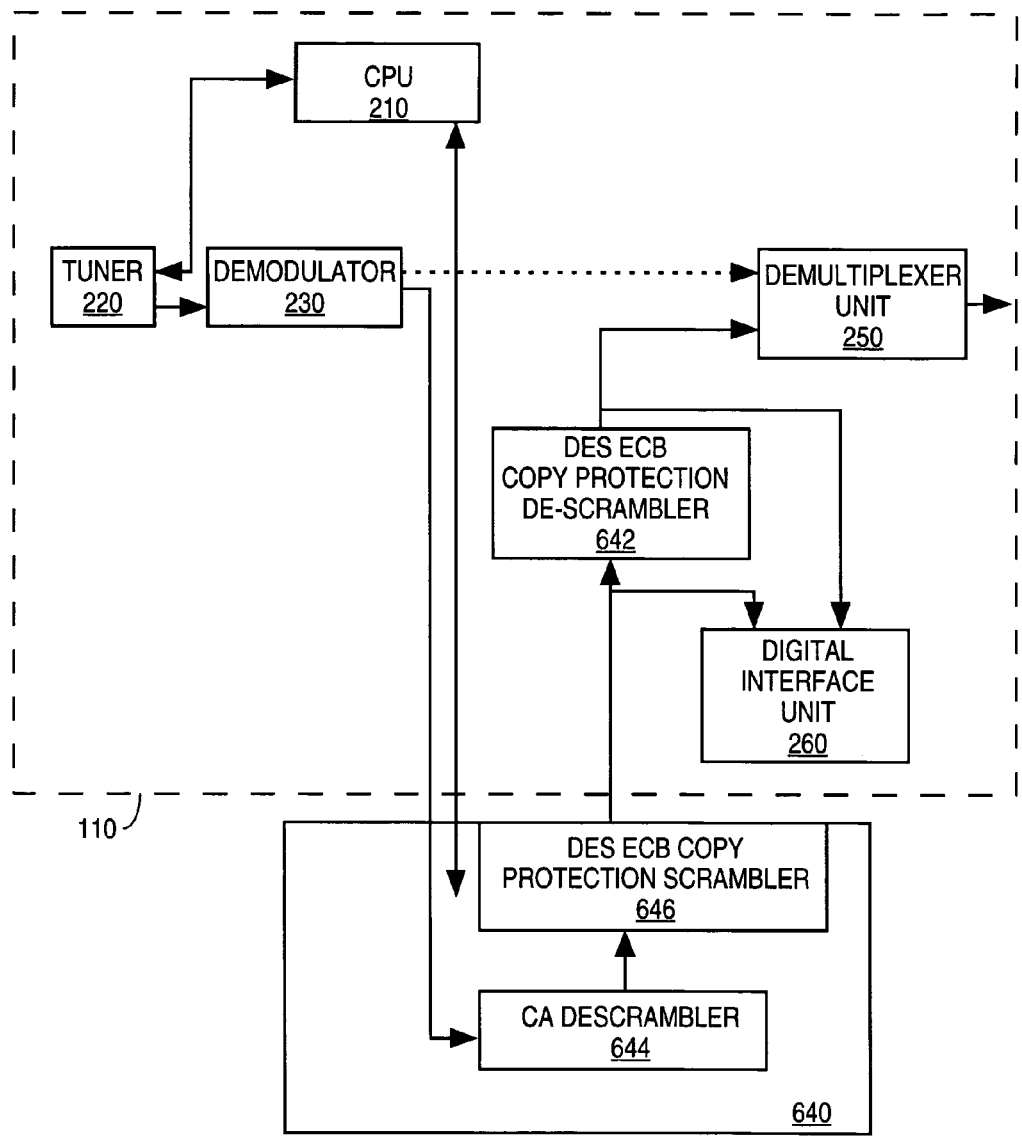
FIG. 6 is a block diagram of an embodiment of the digital receiver of the digital device.

Some digital devices 110 may include an NRSS copy protection system having a detachable NRSS module. In instances where a detachable NRSS module is used, it is desirable to take advantage of the scrambled bitstream coming from the NRSS module. As seen in FIG. 6, yet another embodiment of a digital receiver 111 is shown which includes an NRSS copy protection system having a detachable NRSS module 640 and a DES ECB copy protection chip 642. In this embodiment, the bitstream is provided from demodulator 230 to the NRSS module which is detachably connected to the digital device 110. Scrambled output from NRSS module 640 is "tapped" outside of the digital device 110 prior to the bitstream's re-entry into the digital device 110 and is provided to the digital interface 260 where it is preferably marked as "copy free" and then transmitted over the transmission medium 120. A second scrambled stream is provided to the DES ECB copy protection chip 642 for descrambling. One descrambled stream is then provided to the de-multiplexer unit 250, while a second descrambled stream is provided to the digital interface 260 where it is preferably marked as "copy never" and then transmitted over the transmission medium 120. Again, in such embodiment, a content or service provider can control when and if a user can copy or view again content which is copy-protected.

The content of a digital program may be transmitted in scrambled form. In order for a conditional access unit to recover the scrambled content and permit a person to view the content in clear form, the unit must have the necessary access requirements associated with the scrambled content. An access requirement includes a message that describes the features that the conditional access unit must have in order to decode the scrambled content. For example, a certain key may be needed to view the content. Alternatively, a service tag associated with a given content provider may be required. Technical requirements such as a particular descrambling method may also be required and included as a part of the access requirements. The access requirements associated with a particular program may be transmitted to a conditional access unit along with the program.

When a scrambled program is received by a conditional access unit, the access requirements for the program are compared to the entitlements that the conditional access unit actually has. In order for the conditional access unit to display the scrambled content in clear form, the access requirements for the program must match the entitlements of the conditional access unit. The entitlements may state that the conditional access unit is entitled to view content from a given service provider such as HBO, for example. The entitlements may also include one or more keys needed to descramble the content. The entitlements also may define the time periods for which the conditional access unit may descramble programs. The access requirements and entitlements thus form a part of the access control system to determine whether a decoder is authorized to view a particular program.

The access requirements and entitlements can provide consumers with a variety of choices for paying for the content and gaining access to the scrambled content. These choices may include pay per play (PPP), pay per view (PPV), impulse pay per view (IPPV), time based historical, pay per time (PPT), repurchase of copy never movies, personal scrambling, and regional pay per view. Impulse pay per view is a feature which allows purchase of pay per view movies through credit that has been previously downloaded into the set top box. Purchase records may be stored and forwarded by phone to a billing center. Time based historical allows access to content that was delivered during a past time period, such as March through December, 1997, for example. The access requirements and entitlements can also provide consumers with different options for storing the scrambled content.

These options may be selected by choosing one of a number CA descriptors that have been included in the Service Information (SI) provided by the Service Provider. A terrestrial broadcaster may use CA descriptors defined by an organization such as the ATSC. A cable system operator may use descriptors defined by the Society of Cable Telecommunication Engineers (SCTE). By choosing a CA descriptor, for example the MPAA approved DVD movie standard, a consumer can store the content to a writeable DVD. Included in that content may be the encrypted manufacturer keys needed to descramble that content. The manufacturer keys may be delivered in a PID called out by the CA Program Map Table (PMT). The keys may be stored on the DVD. On playback in a DVD player, the proper manufacturer key for the particular manufacturer of the DVD player can be selected, and the content descrambled accordingly. For example, choosing the DIVX descriptor, allows the storing of content in DIVX format. Similar to DVD, the CAT PID in the CA PMT may select the keys used with the content. A DIVX player may access the content as it normally would access packaged content.

These storage options are available even as realtime descrambling options are available. A consumer may decide which of the operations he or she wishes to perform. Note that with realtime descrambling options, a CAT may call out a PID where an EMM may be obtained. However, in the DVD and DIVX examples, for instance, EMMs may not be delivered with the content that way. They may be embedded in the player and/or delivered by phone.

The program as delivered over the air is conditional access scrambled. The scrambled content may be delivered along with a plurality of access requirements, including pay per view, for example. The conditional access unit can descramble the content for real-time viewing. However, the content may have copy generation management system information which marks the content as copy never. This means that a clear version of the content may not be recorded. A scrambled version of the content can be treated as copy free. In other words, the scrambled content can be recorded in a digital storage medium for later retrieval.

Figure 7:
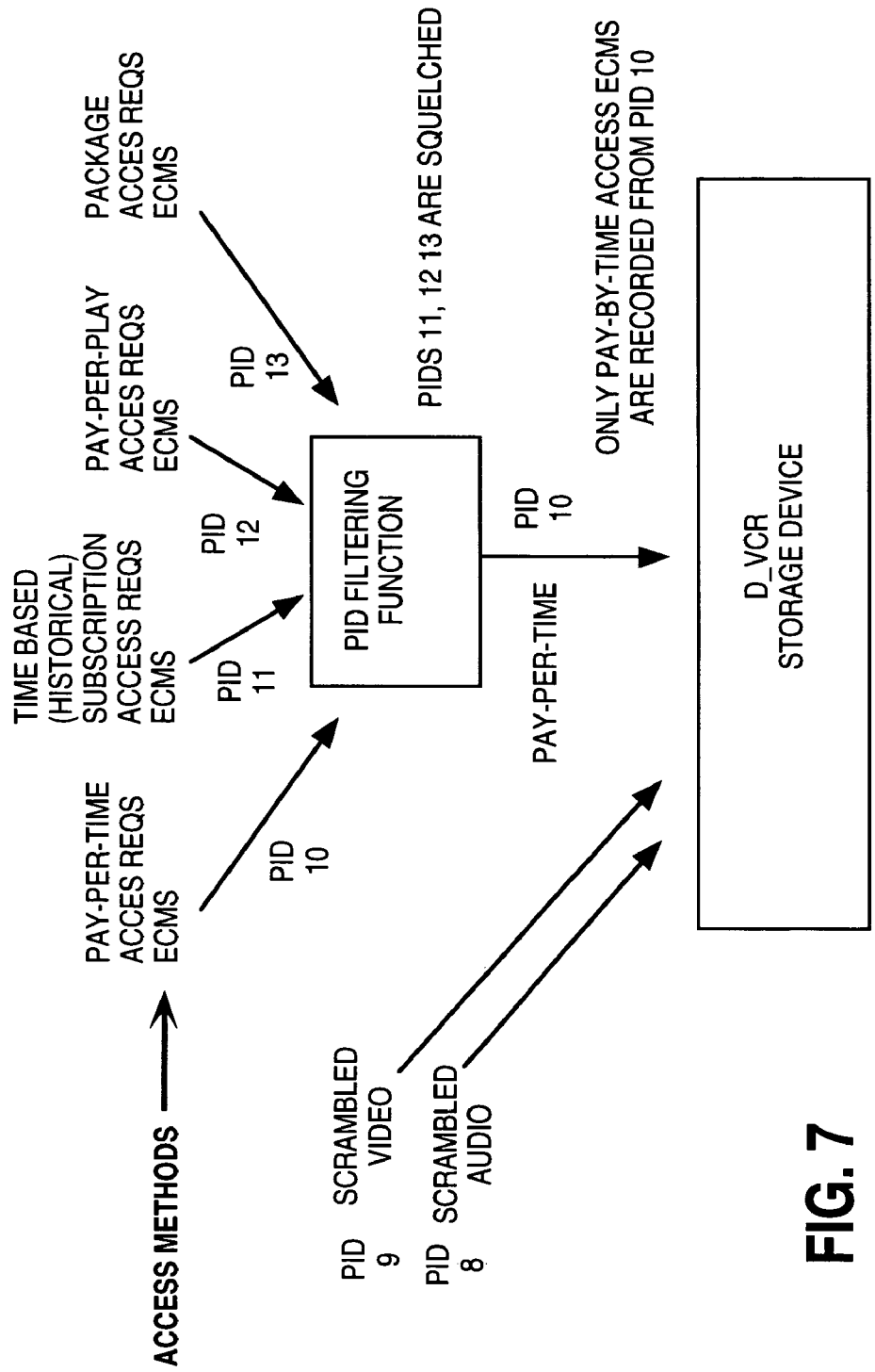
FIGS. 7, 8, and 9 show embodiments of a filtering function.

The access requirements may be delivered to the conditional access unit using packet identifiers (PIDs). Each PID may contain the access requirements associated with a given service or feature. For example, FIG. 7 shows that PID 10 contains access requirements for a pay per time feature. Thus, the content that is delivered to a conditional access unit may also include a large number of PIDs, thus enabling special revenue features, technical features, or other special features to be performed locally. Before receiving the content, the customer may be given a number of choices for gaining access to the content that is going to be stored to media. The customer may be required to purchase the right to access and view the content. Therefore, if the customer wants to record the content for later retrieval and viewing, the access requirements that the customer bought also need to be stored with the content.

When a digital program is recorded, the access requirements needed to view the program may also be recorded along with the program. The access criteria can be delivered to the conditional access device in packet identifiers (PIDs). FIG. 7 shows an example of several PIDs that may be delivered to a conditional access device. PIDs 8 and 9 are for the scrambled audio and video content. PIDs 10, 11, 12 and 13 point to the entitlement control messages for several methods of obtaining the access requirements for the scrambled program content. For example, the user may wish to pay for the content on a pay-per-time basis.

PID 10, which contains the access requirements for pay-per-time, is allowed to pass through the PID filtering function and is recorded in the storage device. The other access requirements, which represent alternative methods of paying for the content, do not pass through the PID filtering function and are thus squelched. The filtering function may be performed by the decoder 250 of the conditional access device.

Recording only the access requirements that the customer has bought provides several advantages. Recording the scrambled content locally enables the special revenue features such as PPV, PPT, and delayed IPPV, for example. A large number of PIDs may be delivered to the conditional access unit to enable these special features. By recording only the PID or PIDs for the service that the customer desires, the storage requirements are reduced. Also, when the customer plays back the content, it would be confusing to the customer to display the payment options again, after the customer has already selected one option. After a customer has decided to view a program as pay per time, for example, the customer should not be able to access the content any other way. This prevents confusion to the customer. The conditional access system is able to process the stream prior to being recorded. The conditional access system can mark the content on the media in order to facilitate future retrieval and access, which allows for a customization of the access rights.

The security of the system is also improved by the filtering function shown in FIG. 7. Recording only one set of access requirements securely prevents hackers from tampering with the conditional access features, because the complexity of the system is reduced. Recording one set of requirements can be done securely. Simplified access using only one option, such as PPV, for example, simplifies the processing, the cryptography, and reduces protocol problems, because only one set of access requirements has to be tracked.

Figure 8:
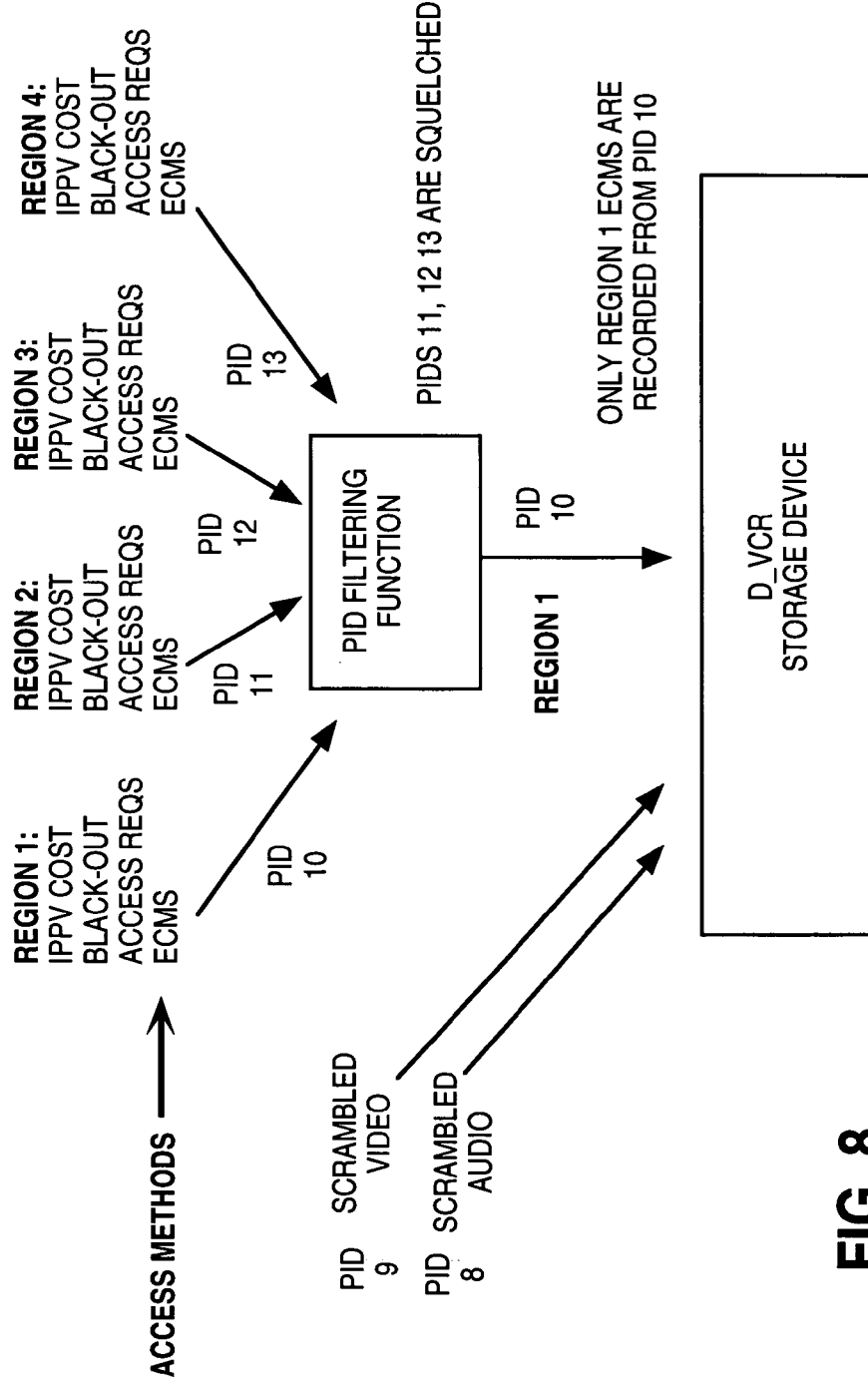

FIG. 8 shows an alternative embodiment that includes regional pay per view. Customers in different regions may have different access requirements for a program, such as different costs. If a person in region 1 wishes to record the scrambled content and view it at a later time, only the access requirements for region 1 pass through the filter and are recorded in the digital storage medium.

Thus, an advantage of recording only the access requirements for one region is that it is much simpler than puffing all access rights for all regions in one ECM. Thus, the system is enabled to offer different costs to different regions. Another advantage is the reduced storage requirements, which is much less than recording all of the regions, and recording information that does not concern a given customer. This way a customer can listen to what is needed and simplify the filtering, because the PID filtering function is based on one region.

Figure 9:
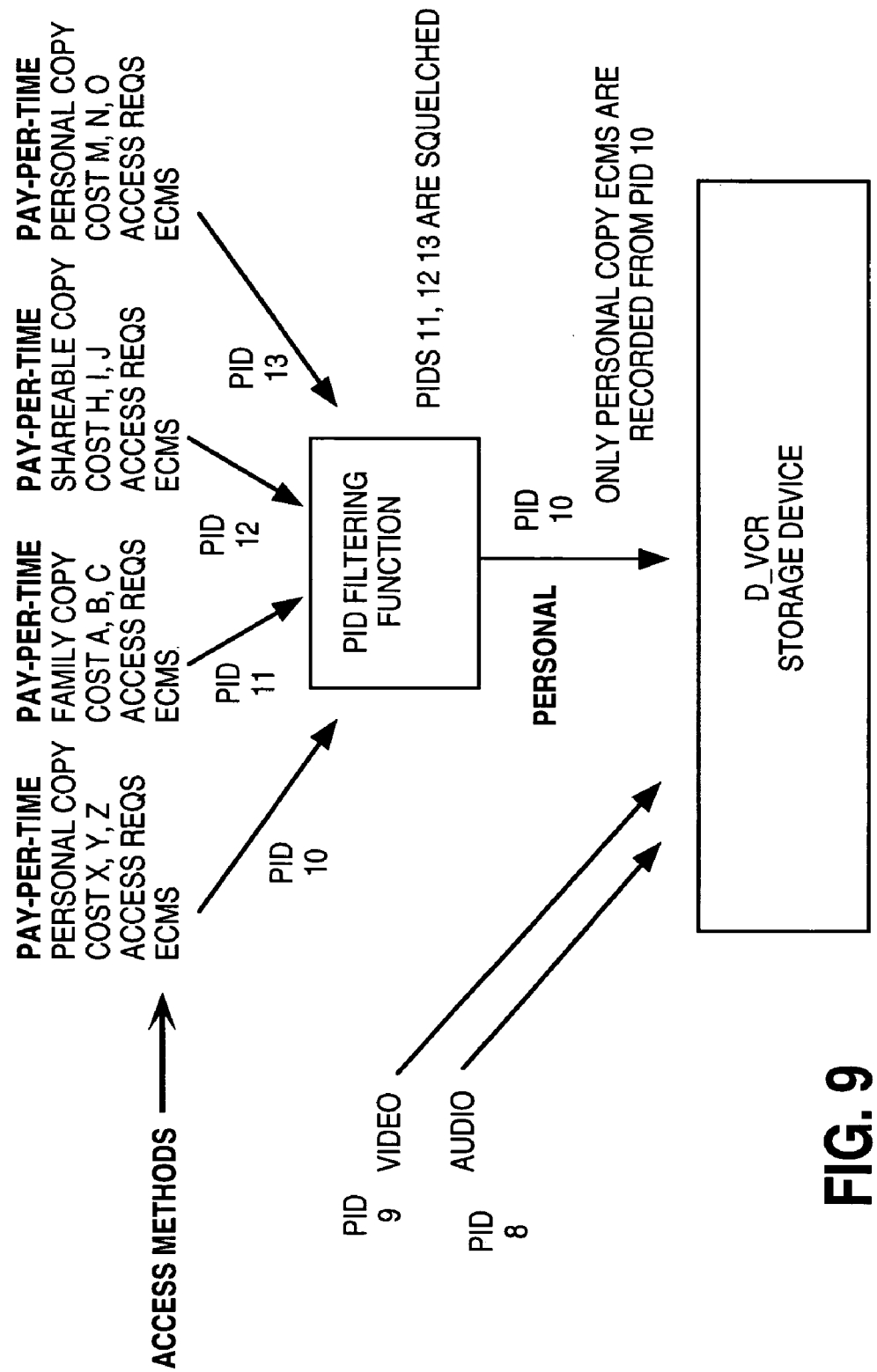

FIG. 9 shows an alternative embodiment that includes personal scrambling features to be delivered to the conditional access device in PIDs. The personal scrambling features allow a customer to customize the special features.

It is therefore apparent that in accordance with the present invention, an embodiment that fully satisfies the objectives, aims, and advantages is set forth above. While the invention has been described in conjunction with specific embodiments, it is evident that many alternatives, modifications, permutations, and variations will become apparent to those skilled in the art in light of the foregoing description. Other embodiments will occur to those skilled in the art. Accordingly, it is intended that the present invention embrace all such alternatives, modifications, and variations as fall within the scope of the appended claims.

The invention claimed is:

1. A copy management method for controlling the recording and reproduction of digital content comprising:
   receiving a digital bitstream including program data, said program data including system information and said digital content in a scrambled format;
   descrambling said digital content in a scrambled format to provide a first output including said digital content in a descrambled format, said descrambling being carried out in a first conditional access unit;
   re-scrambling said digital content in a descrambled format to provide a second output including said digital content in a re-scrambled format, said re-scrambling being carried out in a second conditional access unit; and
   outputting said first output including said digital content in a descrambled format and a second output including said digital content in a re-scrambled format.

2. The copy management method of claim 1, further comprising receiving and recording said digital content of said second output in a scrambled format.

3. The copy management method of claim 1, further comprising:
   demultiplexing said digital content from said program data; and
   decompressing said digital content in a descrambled format to a decompressed state.

4. The copy management method of claim 1, wherein said second conditional access unit is different than said first conditional access unit and implemented with a single digital receiver.

5. The copy management method of claim 1, wherein said digital content is content contained in digital television transmissions.

6. The copy management method of claim 1, wherein said digital content is content downloaded from the Internet.

7. The copy management method of claim 1, wherein said descrambling and re-scrambling steps are carried out in a first conditional access unit.

8. The copy management system of claim 1 further comprising:
   receiving a plurality of access requirements;
   selecting at least one of the access requirements; and
   storing said scrambled program data along with said selected at least one access requirement.

9. The copy management system of claim 1, wherein said descrambling comprises:
   extracting a descrambling key included in said program data; and
   applying said descrambling key to said digital content in a scrambled format to provide said digital content in a descrambled format.

10. The copy management system of claim 1, wherein said descrambling of said digital content being conducted using a key also used to re-scramble said digital content.

11. A copy management system for controlling the recording and reproduction of digital content comprising:
    means for receiving a digital bitstream including program data, said program data including system information and said digital content in a scrambled format;
    means for descrambling said digital content in a scrambled format to provide a first output including said digital content in a descrambled format, said means for descrambling being deployed in a first conditional access unit;
    means for re-scrambling said digital content in a descrambled format to provide a second output including said digital content in a re-scrambled format, said means for re-scrambling being deployed in a second conditional access unit; and
    means for outputting said first output including said digital content in a descrambled format and a second output including said digital content in a re-scrambled format.

12. The copy management system of claim 11, further comprising means for receiving and recording said digital content of said second output in a scrambled format along with an access requirement associated with said digital content.

13. The copy management system of claim 11, further comprising:
    demultiplexing said digital content from said program data; and
    decompressing said digital content in a descrambled format to a decompressed state.

14. The copy management system of claim 11, wherein said first conditional access unit is different than said second conditional access unit and is implemented with a single digital received.

15. The copy management system of claim 11, wherein said digital content is content contained in digital television transmissions.

16. The copy management system of claim 11, wherein said digital content is content downloaded from the Internet.

17. The copy management system of claim 11, wherein said means for descrambling comprises:
    means for extracting a descrambling key included in said program data; and
    means for applying said descrambling key to said digital content in a scrambled format to provide said digital content in a descrambled format.

18. The copy management system of claim 11, wherein said descrambling is conducted using a key also used to re-scramble said digital content.

* * * * *